United States Patent [19]

Vesterberg

[11] 4,235,839

[45] Nov. 25, 1980

[54] DEVICE FOR ANALYSIS

[76] Inventor: Olof Vesterberg, Patrons vag 1B, 130 11 Saltsjo-Duvnas, Sweden

[21] Appl. No.: 968,517

[22] Filed: Dec. 11, 1978

[51] Int. Cl.[3] ........................ G01N 1/10; G01N 31/22

[52] U.S. Cl. .................................. 422/58; 73/421 R; 73/425.4 R; 422/61; 422/100; 422/101

[58] Field of Search ................ 422/61, 100, 101, 102, 422/57, 58, 68; 73/421, 425.4

[56] References Cited

U.S. PATENT DOCUMENTS

| | | | |
|---|---|---|---|
| 1,585,447 | 5/1926 | Webb | 422/101 |
| 2,451,704 | 10/1948 | Wood | 73/425.4 R |
| 3,215,500 | 11/1965 | Bittner | 422/101 |
| 3,481,201 | 12/1969 | Falk | 73/425.4 R |
| 3,509,872 | 5/1970 | Truhan | 422/58 X |

*Primary Examiner*—Michael S. Marcus
*Attorney, Agent, or Firm*—Stevens, Davis, Miller & Mosher

[57] ABSTRACT

A device for the determination of at least one substance in a liquid which comprises a reaction compartment containing a reagent for the substance, a measuring compartment for collection of a predetermined volume of a liquid sample and a facility for transport of the liquid sample, collected in the measuring compartment, to the reaction compartment. The measuring compartment and the reaction compartment are connected with each other by a canal so that when the measuring compartment, with the liquid sample therein, is elevated above the reaction compartment, the liquid flows downwardly into the reaction compartment.

17 Claims, 4 Drawing Figures

DEVICE FOR ANALYSIS

FIELD OF THE INVENTION

This invention relates to a device in which a predetermined volume of a liquid sample, containing a substance, can be collected in a measuring compartment therein; and transported to a reaction compartment therein, containing a reagent for the substance, wherein the liquid sample is mixed with the reagent so that the sample can be tested and analyzed.

SUMMARY OF THE INVENTION

An object of the present invention is to make a structurally simple device for analysis, preferably disposable after use, by which it is easy to accurately measure a certain volume (collect) of a solution to be tested, and in which device there is already present in advance, for the user, a certain amount of reagent, which serves to detect and quantify the substance in the solution to be tested. Detection and quantification can be made by observance of color, light absorption, fluorescence or precipitate formation. The reaction occurs in a special reaction compartment in the device. Due to the ease of use, the device may also be used by untrained persons as well as laboratory technicians or specialists. The device is advantageous since it can result in a saving of manpower and also laboratory facilities. Thus, with the device, there is no need to arrange for suitable test tubes and pipettes for measuring out solutions to be tested or reagent solutions. Preparation of the latter as well as cleaning of used equipment is also eliminated with the invention. These advantages of the invention are particularly appreciated in situations and at places where laboratory facilities are difficult to arrange and yet where it is necessary or desirable to determine or study substances or biological activities. Especially in such situations and also when dealing with unstable agents, it is very valuable to have the reaction carried out on the spot where the sample is obtained, without the delay and waste of time that would result if the sample had to be transported to another location for analysis. The invention is also advantageous because it can result in considerable savings for a laboratory in reducing and possible eliminating the costs of administration, educating personnel and preparing and maintaining qualified facilities. Initially, the device can be used to determine semiquantitative results. The advantages of the invention are still evident, e.g., in critical situations, a rapidly and readily available result is often needed immediately and is sufficient on an immediate basis, even though the result may be only semiquantitative.

According to the invention, the same device is used for measuring out a certain or specified volume of the solution to be tested by using a measuring compartment, for carrying out the reactions which aid in the determination of substances. Suitable reagents and diluting solutions are also present in the device before the customer (user) receives the device. It is therefore extremely easy to use the device without the need for special training or instruction by the user. The device is preferably made of a material transparent to light, e.g., polyethylene, polypropylene, polystyrene, polycarbonate, polyvinylchloride, etc.

To facilitate measuring by light absorption and/or fluorescence as a measure of the amount of substance to be determined, it is advantageous if at least some part of the device is made so that at least two opposite walls of the device are or easily can be made parallel to each other and straight. For some applications, it is advantageous if at least some part of the device is made of elastic material. The device is preferably so made that a certain or specified volume can be taken directly from, e.g., a testtube or from a stream of, for example, urine, blood, water and soil or industrial solutions and suspensions.

The reagents are selected to be suitable for the compounds to be determined, e.g., suitable for reading the results with a suitable specificity, and also stable for storage. Information to be used as a basis can be obtained in original publications describing the analysis of substances, that may be retrieved in Chemical Abstracts.

The reaction compartment may contain reagents in solid form, e.g., in the form of a tablet, or adherent to the inside walls of the device by freeze drying or with aid of a viscous fluid or glue, soluble in the solution to be tested or in a reagent solution or diluting fluid. A reagent solution and/or a diluting fluid may be present in an ampoule within or on the outside of the device, which can be emptied into the reaction compartment by exerting pressure for example with the fingers, so that it gets crushed or opens into the reaction compartment. In the latter case, there is preferably a weakened part that opens to the reaction compartment.

Furthermore, the device for analysis may be equipped with an arrangement for removing particles or substance, that might otherwise interfere with the reaction used for quantification. As an example, for many analyses of blood, the red cells must be removed before analysis. This can be achieved with the device by first bringing the measured sample in contact with an anticoagulant (heparin) and agglutinating agents (such as lectins), which may be present in the device so that the sample solution comes in contact with them before it is filtered. A filter may be present in the device between the measuring compartment and the reaction compartment. Other agents that may be desirable to remove may be ionized. They may be removed by ion exchangers in the filter. Metals may be removed by chelators, even selectively. Other examples of separators that may be used are hydrophobic filters, which may separate, e.g., water from organic solvents; binding by hydrophobic interaction, affinity and molecular sieving. At least some part of the device on the reaction chamber side of the filter is preferably elastic and a hole is present. This flexible part is compressed after a suitable contact time, after which the hole is closed with a finger. When the compression is released, the walls now by elasticity return to their original position, creating an underpressure and a suction or vacuum which forces the solution through the filter. Suitable reagents and dilutents may be added as described earlier.

Throughout the drawings, parts having similar or identical functions have been identically numbered.

DESCRIPTION OF THE PREFERRED EMBODIMENTS

Figure 1:
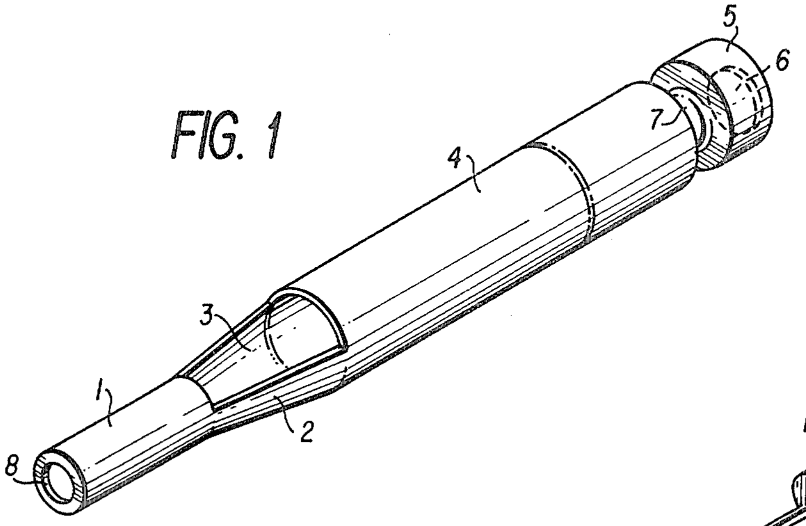
FIG. 1 is a perspective of a first embodiment of the invention.

The analyzing device shown in FIG. 1 can be of an elastic (or flexible) or rigid plastic. The device contains a measuring compartment 1, that is to be filled completely with the test solution. The measuring compartment 1 is connected to a reaction compartment 5 via a transfer device, which comprises a canal part 2 that is open at 3 and a tube-shaped part 4 that is open in the end adjacent the canal part 2, and at its other end passes into the reaction compartment 5. The reaction compartment 5 is closed at the end opposite to the canal 2. In the reaction compartment 5 is shown a reagent in the form of a tablet 6 that is retained by a neck 7 of reduced diameter. When the measuring compartment 1 is placed into a liquid, the measuring compartment 1 is filled with the liquid. The outer end of the measuring compartment 1 is hydrophobic, or as shown in FIG. 1, is shaped with a radially inward projecting flange 8 that prevents the liquid from flowing out through the outer opening. When the device is lifted, so that the measuring compartment is above the canal 2, the liquid in the measuring compartment will flow via the canal 2 and the tube-shaped part 4 down into the reaction compartment 5, whereupon one substance in the liquid can react with the reagents in the tablet 6.

Figure 2:
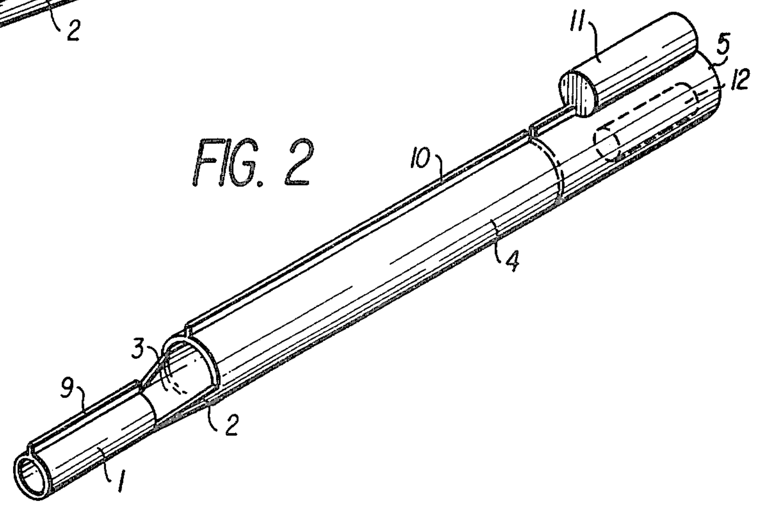
FIG. 2 is a perspective of a second embodiment of the invention.

FIG. 2 shows another embodiment of the invention which can be made of thin elastic plastic, such as polyethylene, polypropylene, or soft polyvinylchloride, which can be assembled by gluing or welding. The reagents and/or dilutents (diluting fluids) are presents in ampoules 11,12. By the mentioned gluing or welding, edges 9,10 are formed where the walls meet. On the outside of the device is shown the ampoule 11. Within the device is shown the ampoule 12, which by constrictions or gluing is prevented from slipping out of the reaction compartment 5 into the tube part 4. In a corresponding manner, additional ampoules can be present within or on the outside of the device. The ampoules are preferably constructed so that they have at least one wall-piece or seal that is weakened, or they may be made of fragile material that may be split or at least broken, whereby the ampoule can be emptied into the reaction compartment 5 when compressing the device from the outside. Measuring and transfer of the liquid to be tested is made in the manner described above with respect to the embodiment of FIG. 1.

Figure 3:
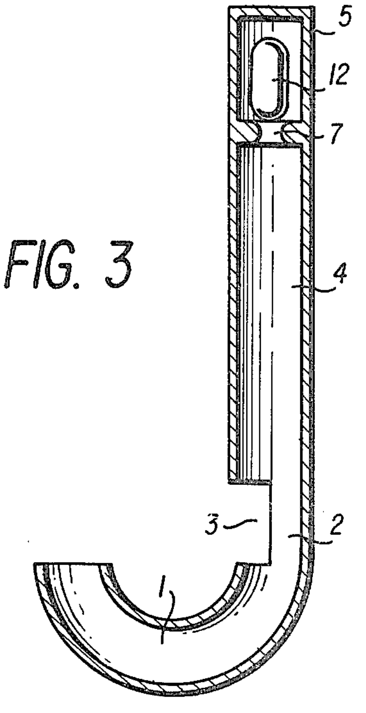
FIG. 3 is a longitudinal cross-sectional view of a third embodiment of the invention.

FIG. 3 shows another embodiment that can be made of flexible or rigid material. In the latter case, it is preferable that the outer wall of the device at the ampoule position, around the compartment 5, be made of flexible material, so that it is possible to compress and empty the ampoule of its contents. The device is used in the manner described above with respect to the embodiments of FIGS. 1 and 2.

It is also contemplated in this invention that the ends of the measuring compartments 1, remote from the reaction compartments 5, in the embodiments of FIGS. 1 through 3 could be completely closed.

Figure 4:
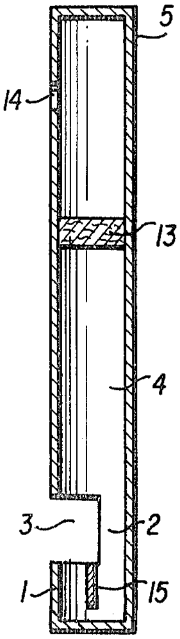
FIG. 4 is a longitudinal cross-sectional view of a fourth embodiment of the invention.

FIG. 4 shows another embodiment that can be made of flexible as well as rigid material. In the latter case, it is advantageous that the outer wall of the tube-shaped part 4, that is situated above the filtering device 13, be at least partially made of elastic material. The filtering device can be made of porous or fibrous material such as cellulose. It can also be of hydrophobic character, e.g., comprise or consist of siliconized cellulose, in order to preferably let through hydrophobic fluids, such as organic solvents such as $CHCl_3$ (chloroform). The device also has a hole at 14 and carries a partition wall at 15. Reagents can be present at 5 in some of the ways that are described with respect to the embodiments of FIGS. 1 through 3. Measuring and testing solutions and transport thereof to the tube-shaped part 5 can be made as described above with respect to the embodiment of FIG. 1. Filtering of the solution can be facilitated by compression of the section of the tube-shaped part 4 that is on the same side of the filter as the reaction compartment, and then, with the hole 14 closed by a finger, by allowing the walls to return to their original position by elasticity, whereupon an underpressure or vacuum is formed that suctions the solution through the filter 13.

The embodiments of FIGS. 3 and 4 are particularly advantageous because the measuring compartments 1 can accommodate larger volumes of solution than is possible with the embodiments of FIGS. 1 and 2.

EXAMPLE 1

A device according to FIG. 2 where the reaction compartment 5 contains an ampoule with 0.3 ml of 10% trichloroacetic acid in water, and with a measuring compartment 1 for measuring out 0.15 ml of solution, is used in the following manner: The measuring compartment is dipped into a beaker containing urine. The measured urine sample is transferred to the reaction compartment by turning the device so that the measuring compartment is directly above the reaction compartment. Simultaneously, one compresses with the fingers of one hand, the ampoule or the ampoules 11 and 12, which are thereby emptied into the reaction compartment, whereupon the reagents are mixed with the urine. Urine samples that have, with quantitative methods, been shown to contain more than 0.2 g of protein/l, give precipitates that increase with increasing protein concentration.

EXAMPLE 2

A device according to FIG. 2, where the reaction compartment 5 contains an ampoule 12 with a reagent consisting of 1/6 of a tablet of Clinitest ® manufactured by the Ames Co., Elkhart, IN, USA or essentially the same amount of a dry powder mixture with the corresponding function consisting of cupper sulfate, sodium sulfate, trisodium citrate, citric acid, sodium carbonate and sodium hydroxide. Another ampoule 11 contained 0.1 ml of water. The measuring compartment 1 was made to measure 0.025 ml of liquid. The device was used as in Example 1. In this way, glucose in urine could be detected provided the concentration was above 0.5%. At glucose concentrations between 0.5 and 1%, a green color was obtained. If the glucose concentration was above 2%, a yellow-brown color was obtained. At glucose concentrations above 4%, a yellow concentration was obtained. Thus it was possible to make a determination of the glucose concentration in a simple way.

Although the invention has been described above with reference to specific preferred embodiments thereof, it will be evident to persons ordinarily skilled in the art that changes and modifications may be made to the invention without departing from the scope of the invention defined by the claims.

I claim:

1. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance, said reaction compartment being closed at the end thereof most remote from the measuring compartment; and means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment.

2. A tubular analysis device for the determination of at least one substance in a liquid sample, said device having a substantially straight longitudinal axis and comprising:

means defining a substantially constant diameter tubular measuring compartment at one end thereof for the collection of a predetermined volume of the liquid sample;

means defining a substantially constant diameter tubular reaction compartment containing a reactant means for the substance and being of larger diameter than the measuring compartment;

means defining a tubular connecting section fluidly interconnecting said measuring compartment and said reaction compartment; and means defining a second connecting section substantially U-shaped in cross-section, transverse to the longitudinal axis, directly interconnecting said collection chamber and said tubular connecting section and thereby defining an opening from the second connecting section to atmosphere.

3. An analysis device as claimed in claim 2, wherein: said device is made of a transparent material.

4. A substantially straight tubular analysis device for the determination of at least one substance in a liquid sample, said device having a substantially straight longitudinal axis and comprising:

means defining a measuring compartment of a given diameter at one closed end thereof for the collection of a predetermined volume of the liquid sample;

means defining a reaction chamber of said given diameter at the other closed end thereof, said reaction chamber containing a reactant means for the substance;

a tubular connecting section of said given diameter fluidly interconnecting said measuring compartment and said reaction compartment; and means defining a second connecting section substancially part-circular in cross-section, transverse to the longitudinal axis, and of said given diameter directly interconnecting said collection chamber and said tubular connecting section and thereby defining an opening from said second connecting section to atmosphere.

5. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance;

means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment; and said measuring compartment is U-shaped in longitudinal cross-section and is open at its free end on one leg of the U.

6. An analysis device as claimed in claim 5, wherein: said reaction compartment is made of flexible material;

a reduced diameter section interconnects said connecting section and said reaction compartment; and a breakable ampoule containing the reactant in said reactant compartment.

7. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance;

means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment;

said one end of said tube is open; and a radially inwardly extending flange made of hydrophobic material on said one end to prevent the flow of liquid out of the measuring compartment through said one end.

8. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance;

means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment;

said tube is closed at said one end; and an axially extending wall in said measuring compartment, said wall terminating a short distance from said closed end.

9. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance;

means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment;

an ampoule;

said reagent being stored in said ampoule; and said ampoule is crushable so as to release the reagent into the reaction chamber.

10. An analysis device as claimed in claim 9, wherein:

said ampoule is within the reaction compartment; and the reaction compartment is made of flexible material so that the ampoule can be crushed by hand in the reaction compartment.

11. An analysis device as claimed in claim 9, wherein:

the ampoule is on the exterior of the reaction compartment.

12. A substantially tube-shaped analysis device for the determination of at least one substance in a liquid sample, said device comprising:

means defining a measuring compartment at one end of the device for the collection of a predetermined volume of the liquid sample;

means defining a reaction compartment, spaced from said one end of the device, containing a reagent for the substance;

means interconnecting the reaction compartment and measuring compartment through which the liquid sample can flow from the measuring compartment to the reaction compartment when the measuring compartment is positioned above the reaction compartment, and said interconnecting means comprising a tubularly shaped canal having an opening in the wall thereof and adjacent to said measuring compartment, said opening communicating the interior of said device to the atmosphere through which liquid sample can enter and excess sample beyond the predetermined volume of said measuring compartment can exit when the reaction compartment is above the measuring compartment; and a filtering device between the measuring compartment and the reaction compartment.

13. An analysis device as claimed in claim 12, wherein:

the reaction compartment is made of flexible material.

14. An analysis device as claimed in claim 12, further comprising:

means defining a hole in the reaction compartment to fluidly communicate it with atmosphere.

15. A tubular analysis device for the determination of at least one substance in a liquid sample, said device having a substantially straight longitudinal axis and comprising:

means defining a tubular measuring compartment at one end thereof for the collection of a predetermined volume of the liquid sample;

means defining a tubular reaction compartment at the other end thereof, said reaction compartment containing a reactant means for the substance;

means defining a tubular connecting station fluidly interconnecting said measuring compartment and said reaction compartment;

means defining a second connecting section substantially U-shaped in cross-section, transverse to the longitudinal axis, interconnecting said collection chamber and said tubular connecting section and thereby defining an opening from the second connecting section to atmosphere;

a reduced diameter section interconnects said tubular connecting section and said reaction compartment;

a tablet containing the reactant means is in said reaction compartment; and said collection compartment has a radially inwardly extending flange made of hydrophobic material on the end of the collection compartment remote from the reaction compartment.

16. A tubular analysis device for the determination of at least one substance in a liquid sample, said device having a substantially straight longitudinal axis and comprising:

means defining a tubular measuring compartment at one end thereof for the collection of a predetermined volume of the liquid sample;

means defining a tubular reaction compartment at the other end thereof, said reaction compartment containing a reactant means for the substance;

means defining a tubular connecting section fluidly interconnecting said measuring compartment and said reaction compartment;

means defining a second connecting section substantially U-shaped in cross-section, transverse to the longitudinal axis, interconnecting said collection chamber and said tubular connecting section and thereby defining an opening from the second connecting section to atmosphere;

the reaction compartment is made of flexible material;

a first breakable ampoule containing the reactant means is in said reaction compartment; and a second breakable ampoule is mounted on the exterior of the reaction compartment and is openable thereinto.

17. A substantially straight tubular analysis device for the determination of at least one substance in a liquid sample, said device having substantially straight longitudinal axis and comprising:

means defining a measuring compartment at one closed end thereof for the collection of a predetermined volume of the liquid sample;

means defining a reaction chamber at the other closed end thereof, said reaction chamber containing a reactant for the substance;

a tubular connecting section fluidly interconnecting said measuring compartment and said reaction compartment;

means defining a second connecting section substantially U-shaped in cross-section, transverse to the longitudinal axis, directly interconnecting said collection chamber and said tubular connecting section and thereby defining an opening from said second connecting section to atmosphere;

a longitudinally extending partition wall in said collection compartment, said wall terminating a short distance from the closed end of the device;

a filtering device in said tubular connecting section and extending completely transversely thereacross; and means defining an opening through the reaction compartment fluidly communicating it with atmosphere.

* * * * *